(12) United States Patent
LaCroix et al.

(10) Patent No.: US 6,414,479 B1
(45) Date of Patent: Jul. 2, 2002

(54) SENSOR SYSTEM FOR SENSING AXLE SPEED

(75) Inventors: Mark E. LaCroix, New Hartford; A. John Santos, Farmington; Stephen T. Podhajecki, Norfolk, all of CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/729,730

(22) Filed: Dec. 5, 2000

(51) Int. Cl.[7] .............................. G01P 3/44; G01P 3/48; F16C 32/00; G01B 7/14
(52) U.S. Cl. .................. 324/173; 324/207.25; 384/448
(58) Field of Search ................................ 324/174, 173, 324/207.25, 207.22, 207.15; 384/448

(56) References Cited

U.S. PATENT DOCUMENTS

| | | | |
|---|---|---|---|
| 3,937,994 A | 2/1976 | Presley et al. | 310/168 |
| 3,984,713 A | 10/1976 | Presley | 310/155 |
| RE31,199 E | 4/1983 | Presley et al. | 310/168 |
| 5,122,740 A | 6/1992 | Cottam et al. | 324/173 |
| 5,385,410 A | 1/1995 | Shirai et al. | 384/446 |
| 5,385,411 A | 1/1995 | Shirai et al. | 384/446 |
| 5,574,361 A | 11/1996 | Seefeldt et al. | 324/174 |
| 5,622,436 A | 4/1997 | Morita et al. | 384/448 |
| 5,663,640 A | 9/1997 | Sakamoto | 324/173 |
| 5,677,624 A | 10/1997 | Miyazaki et al. | 324/173 |
| 5,744,720 A | 4/1998 | Ouchi | 73/514.39 |
| 5,779,368 A | 7/1998 | Morita et al. | 384/448 |
| 5,814,984 A | 9/1998 | Ohmi et al. | 324/173 |
| 5,852,361 A | 12/1998 | Ouchi et al. | 324/174 |
| 5,942,891 A | 8/1999 | Miyazaki et al. | 324/173 |
| 5,967,669 A | 10/1999 | Ouchi | 384/448 |
| 6,111,401 A | 8/2000 | Mierzwinski | 324/173 |
| 6,157,187 A | 12/2000 | Piesch | 324/174 |

*Primary Examiner*—Walter E. Snow
(74) *Attorney, Agent, or Firm*—John C. Bigler

(57) ABSTRACT

A drawn cup wheel bearing is mounted within an axle tube and supports an axle shaft mounted in the drawn cup wheel bearing with a vehicle mounting flange of the axle shaft positioned axially outwardly of the axle tube. An annular target is supported from the vehicle mounting flange of the axle shaft such that the target is positioned axially inwardly of the vehicle mounting flange and is positioned over the axle tube. A sensor is supported from the axle tube over the annular target for sensing rotation of the annular target.

5 Claims, 2 Drawing Sheets

SENSOR SYSTEM FOR SENSING AXLE SPEED

BACKGROUND OF THE INVENTION

Figure 1:
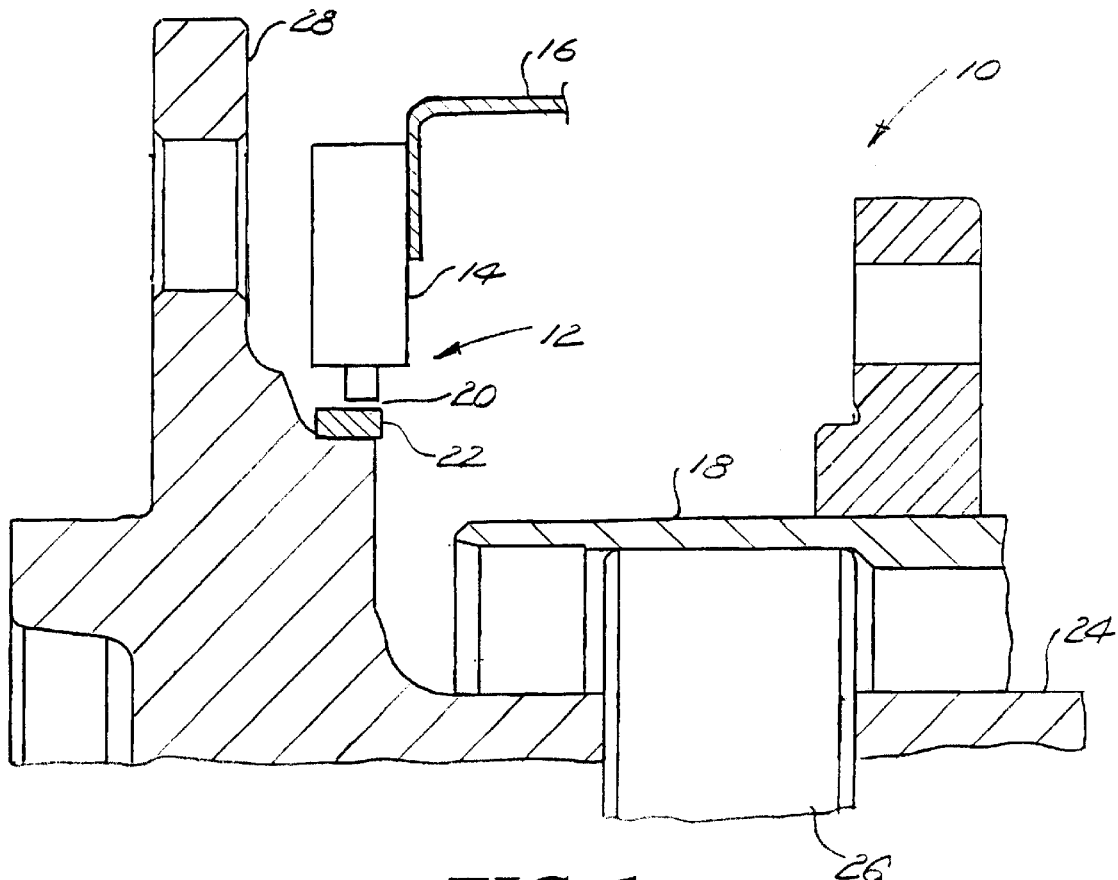

This invention relates generally to speed sensor systems for sensing rotational speed, and, more particularly, to a sensor system suitable for semi- or full floating type axles with drawn cup wheel bearings.

Typically, semi- or full floating type axles are used for the wheels of pickup trucks and rear wheel drive passenger cars. A drawn cup wheel bearing may be pressed into the axle tube with rollers of the bearing riding directly on the axle shaft, thereby providing a low cost bearing that requires very little axial space and is capable of carrying high loads. However, when a drawn cup wheel bearing is used on such axles, the drawn cup wheel bearing provides no axial support of the axle shaft because the axle shaft is typically retained with a mechanical interlock at the inboard end of the axle shaft. As a result of the reduced axial support, the axle shaft pivots at the bearing, creating a slope of the axle shaft through the bearing when the axle shaft is under axial or radial loads.

Common variable reluctance type speed sensor systems use. a tone wheel or gear as a target and a magnet, coil of wire and metallic pole piece as a sensor. These are generally mounted at the end of the axle shaft with the tone wheel pressed on a step formed in the back of a vehicle mounting flange. If such sensor systems were used with a drawn cup wheel bearing on a semi- or full floating type axle, the slope of the axle shaft through the drawn cup wheel bearing would cause the critical air gap between the target and sensor to fluctuate and reduce signal accuracy. Because of this incompatibility with such speed sensor systems, several axle applications that have traditionally used drawn cup wheel bearings have switched to more expensive and larger radial ball bearings or tapered roller bearings with machined races in order to reduce the axle shaft slope.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a sensor system for sensing axle shaft speed comprising an axle tube, a drawn cup wheel bearing mounted within the axle tube, and an axle shaft mounted in the drawn cup wheel bearing with a vehicle mounting flange of the axle shaft positioned axially outwardly of the axle tube. An annular target is supported from the vehicle mounting flange of the axle shaft such that the target is positioned axially inwardly of the vehicle mounting flange and is positioned over the axle tube. A sensor is supported from the:axle tube over the annular target for sensing rotation of the annular target.

The foregoing and other aspects will become apparent from, the following detailed description of the invention when considered in conjunction with the accompanying drawing figures.

BRIEF DESCRIPTION OF THE DRAWING FIGURES

Figure 2:
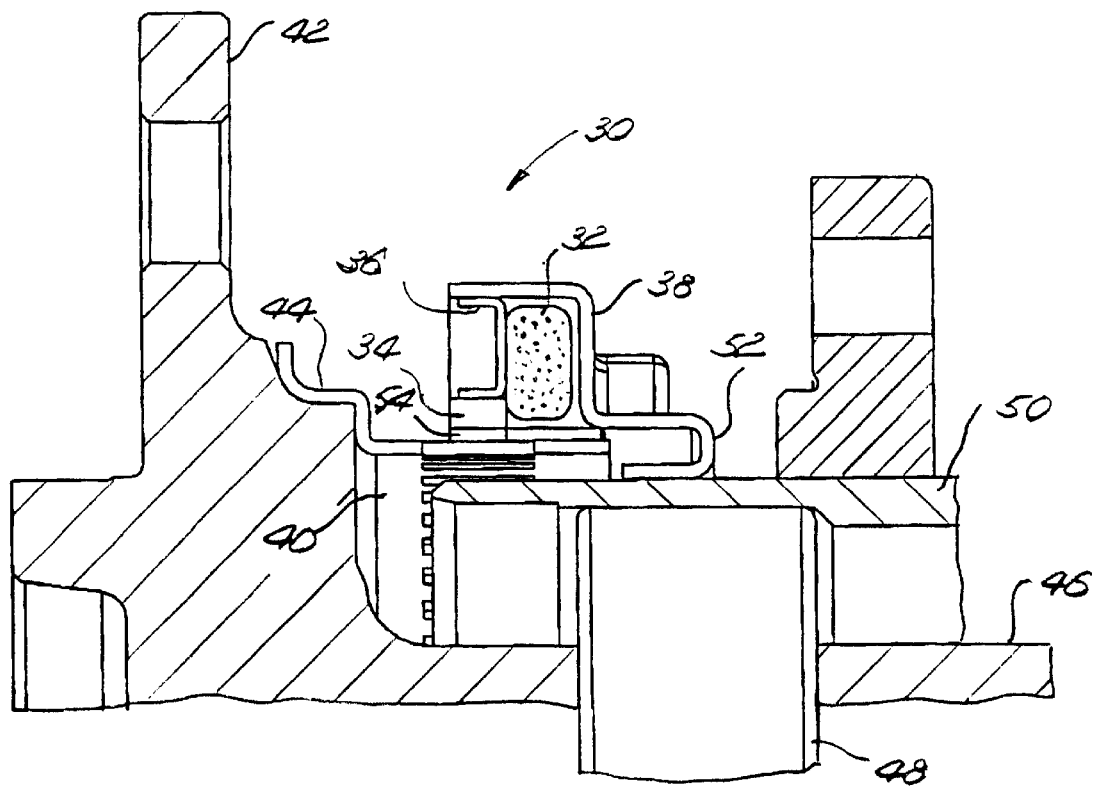

FIG. 1 is a cross sectional view of a semi- or full floating type axle with a sensor system according. to the prior art, for sensing axle shaft speed; and FIG. 2 is a cross sectional view of a semi- or full floating type axle with a sensor system according to the present invention, for sensing axle shaft speed.

DETAILED DESCRIPTION

Referring now to the drawings, FIG. 1 illustrates a semi- or full floating type axle 10 with a prior art sensor system 12. A conventional variable resistance (VR) sensor assembly 14 is mounted on a sensor mounting bracket 16 that is fixed with respect to an axle tube 18. The VR sensor assembly includes a magnet with a single pole pair. An air gap 20 separates the VR sensor assembly 14 from gear teeth 22 of a tone wheel type target that is pressed on a step formed in the back of a vehicle mounting flange 28. An axle shaft 24 is mounted in a machined-race radial ball or tapered roller wheel bearing 26, as described above, to avoid slope of the axle shaft 24 through the wheel bearing 26 that would interfere with the sensing of axle speed when the axle shaft 24 is under axial or radial loads.

The air gap 20 must be narrow and free of fluctuations to provide an accurate signal of rotational speed of the axle shaft 24. If a drawn cup wheel bearing were substituted for wheel bearing 26, pivoting of the axle shaft 24 at the drawn cup wheel bearing could cause the teeth 22 of the tone wheel target to move radially with respect to the axle tube 18, the sensor mounting bracket 16, and the VR sensor assembly 14. This relative movement would cause fluctuations in the air gap 20 that could prevent an accurate sensing of the rotational speed of the axle shaft 24. Specifically, the VR sensor assembly 14 would have to be positioned radially outward of the gear teeth 22 a sufficient distance to avoid contact with the gear teeth 22 when the axle shaft 24 pivots upward, and, as a result, there could be a loss of signal when the axle shaft 24 pivots downward, creating a maximum air gap 20.

The present invention capitalizes on the fact that, while the slope of the axle shaft may be larger with drawn cup wheel bearings, the axle shaft in fact pivots as it passes through the bearing. By mounting a target that extends a full 360 degrees around the bearing in a position with as little offset as possible from the bearing's outermost load zone, the relative movement between the sensor and the target may be reduced to a level that will allow reliable speed sensing over the range of slope seen in vehicle operation. This results because the bending of the axle shaft between the vehicle mounting flange and the drawn cup wheel bearing is minimal and is not a significant contributor to the sensor to target spacing. Furthermore, the target may be mounted in the traditional location, on a step of the axle flange that mounts: the vehicle wheel, as long as the target extends axially inward, toward the bearing.

A typical sensor system configuration 30 according to the present invention, as illustrated in FIG. 2, comprises an annular coil 32 of fine wire, a multi-pole pair magnet 34, and an intermediate steel member 36 that are mounted on a steel cup 38. A steel tone wheel target 40 completes a magnetic circuit. The tone wheel target 40 extends axially outwardly to axle flange 42, that is used for mounting a vehicle wheel, and then radially outwardly, forming a lip 44 that is pressfit over a shoulder of the axle flange 40 to secure the tone wheel target 38 to the axle shaft 46. The axle shaft 46 is mounted in a drawn cup wheel bearing 48 that is pressfit against an internal shoulder of axle tube 50. Steel cup 38 has a folded. portion 52 that is pressfit over an external surface of axle tube 50.

The tone wheel target 40 has the same number of teeth as the number of pole pairs of the multi-pole pair magnet 34.

When the teeth of the tone wheel target 38 are in alignment with all North poles of the multi-pole pair magnet 34, providing an easy return path for magnetic flux through air gap 54, steel cup 38 and steel intermediate member 36, magnetic flux is driven through the coil 32 in one direction. Other ferrous materials may be used in place of steel with similar effect. After the tone wheel rotates a small distance, the teeth of the tone wheel target 38 line up with all South poles of the multi-pole pair magnet 34, driving magnetic flux through the coil in the opposite direction. This changing magnetic flux through the coil 32 results in an alternating voltage at the output of the coil 32.

In contrast to the embodiment of FIG. 2, with the prior art sensor system of FIG. 1, the magnetic flux through the coil of the sensor is merely increased and decreased as the teeth 20 of the tone wheel pass the pole piece.

Several sensor system configurations may be used to implement the present invention. In each case, the target is attached to the axle shaft and rotates with the vehicle wheel. The sensor assembly is mounted to the axle tube directly or indirectly through an intermediate bracket or the brake backing plate. For example, as an alternative to the embodiment of FIG. 2, the multi-pole pair magnet can be used as the rotating element producing an alternating field in an annular coil. In this case, the fixed sensor pole piece would have teeth that would alternately line up with a series of North and South poles on the rotating multi-pole pair magnet, causing an alternating magnetic field to move in and out of the coil.

A third alternative would be to place an active magnetic sensor (Hall or magneto resistor) in the fixed sensor assembly, and use this sensor to detect a rotating multi-pole magnet or a tone wheel. The active magnetic sensor would be biased with a magnet in order to detect a ferric tone wheel. A fourth alternative would use a probe type VR sensor. The air gap variation would still be minimized because the target would be very close to the bearing. In each application, the sensor system configuration is optimized by placing the sensor/target interface as close as possible to the effective pivot point of the axle shaft. This reduces the effects of axle shaft slope on the critical air gap between the sensor assembly and the rotating target.

Significantly, the mounting configuration of the present invention may be used with almost any target and sensor assembly. For example, a conventional variable resistance sensor assembly, similar to the VR sensor assembly 14 of FIG. 1, may be used in place of the multi-pole pair magnet 34 shown in FIG. 2. Instead of being mounted axially outward of the axle tube, as in FIG. 1, where the movement of the pivoting axle shaft is the greatest, the tone wheel is mounted as shown in FIG. 2, such that the tone wheel extends axially inwardly to a position adjacent to the drawn cup wheel bearing. The VR sensor assembly is also mounted adjacent to the drawn cup wheel bearing, radially outwardly of the teeth of the tone wheel, such that movement between the target and sensor assembly is minimized.

The present invention provides a sensor system configuration that allows axle manufacturers to use lower cost high capacity drawn cup wheel bearings, the type wheel bearings commonly use today, and still provide a wheel speed signal that is needed for ABS and vehicle stability control systems. With the present invention, such manufacturers will be able to avoid a redesign of their axles that would otherwise be required to accommodate larger and more expensive tapered roller or radial ball bearings with machined races.

Having described the invention, what is claimed is:

1. A sensor system for sensing axle shaft speed comprising:
   an axle tube;
   a drawn cup wheel bearing mounted within the axle tube;
   an axle shaft mounted in the drawn cup wheel bearing with a vehicle mounting flange of the axle shaft positioned axially outwardly of the axle tube;
   an annular target supported from the vehicle mounting flange of the axle shaft such that the target is positioned axially inwardly of the vehicle mounting flange and is positioned over the axle tube; and
   a sensor supported from the axle tube over the annular target for sensing rotation of the annular target.

2. The sensor system according to claim 1, wherein the sensor extends around a circumference of the axle tube such that the sensor senses the target at a plurality of points distributed along that circumference.

3. The sensor system according to claim 1, wherein the sensor includes a variable reluctance (VR) sensing device.

4. The sensor system according to claim 1, wherein the annular target and the sensor are located in proximity to the drawn cup wheel bearing.

5. A sensor system for sensing axle shaft speed comprising:
   an axle tube;
   a drawn cup wheel bearing mounted within the axle tube;
   an axle shaft mounted in the drawn cup wheel bearing with a vehicle mounting flange of the axle shaft positioned axially outwardly of the axle tube;
   a tone wheel supported from the vehicle mounting flange of the axle shaft such that the tone wheel is positioned over the axle tube, the tone wheel having a plurality of regularly spaced teeth;
   a ferrous cup mounted on the axle tube;
   an annular coil mounted within the ferrous cup; and
   an annular multi-pole pair magnet mounted on the ferrous cup radially outwardly of at least a portion of the tone wheel, the number of pole pairs of the multi-pole pair magnet being equal to the number of teeth on the tone wheel, the pole pairs comprising North and South poles regularly spaced about a circumference of the multi-pole pair magnet such that magnetic flux is driven through the annular coil in one direction by alignment of North poles with the teeth of the tone wheel and in another direction by alignment of South poles in alignment with the teeth of the tone wheel.

* * * * *